(12) United States Patent
Beaujot

(10) Patent No.: US 7,104,205 B2
(45) Date of Patent: Sep. 12, 2006

(54) PIVOTING ARM FOR SEEDERS

(75) Inventor: Norbert Beaujot, Regina (CA)

(73) Assignee: Straw Track Manufacturing Inc., Regina (CA)

( * ) Notice: Subject to any disclaimer, the term of this patent is extended or adjusted under 35 U.S.C. 154(b) by 181 days.

(21) Appl. No.: 10/749,376

(22) Filed: Jan. 2, 2004

(65) Prior Publication Data

US 2004/0159271 A1 Aug. 19, 2004

(30) Foreign Application Priority Data

Jan. 2, 2003 (CA) .................................. 2415928

(51) Int. Cl.
*A01B 49/04* (2006.01)
*A01C 5/00* (2006.01)

(52) U.S. Cl. ....................................... 111/141; 111/150

(58) Field of Classification Search ................ 111/139, 111/141, 148, 150, 186–189
See application file for complete search history.

(56) References Cited

U.S. PATENT DOCUMENTS

| 4,762,075 A | 8/1988 | Halford |
| 5,396,851 A | 3/1995 | Beaujot |
| 5,996,514 A * | 12/1999 | Arriola et al. .............. 111/124 |

* cited by examiner

*Primary Examiner*—Christopher J. Novosad
(74) *Attorney, Agent, or Firm*—Nixon & Vanderhye P.C.

(57) ABSTRACT

A pivot mechanism for pivotally attaching two members about a pivot axis comprises a first member defining a first pivot hole, and having first and second bearing surfaces oriented perpendicular to the pivot axis. A second member defines a second pivot hole aligned with the first pivot hole, and a pivot plate defines a plate pivot hole aligned with the first and second pivot holes such that inner surfaces of the second member and pivot plate are parallel to the bearing surfaces. Wear pads are located between the inner and bearing surfaces. A pivot pin extends through the pivot holes. The pivot plate and second member are squeezed against the wear pads, and the second member and the pivot plate rotate together with respect to the first member. A residue deflector deflects residue clumps falling off a front seeder leg away from the path of a rear seeder leg.

4 Claims, 4 Drawing Sheets

PIVOTING ARM FOR SEEDERS

This invention is in the field of agricultural implements and like machines, and in particular pivoting members, such as the arms commonly used for a furrow opener, pivotally attached to a frame or the like.

BACKGROUND

Agricultural air seeders generally comprise a furrow opener arm pivotally attached to the frame. A furrow opener such as a disc, knife or hoe can be attached to a bottom end of the arm to engage the soil. The arm is maintained in a generally downward operating position by a bias element, and the mounting is such that the arm can move rearward and upward from the operating position, against the bias force, to clear obstacles or follow terrain.

Alternatively, on some air seeders an arm extends rearward and the operating position is dictated by a wheel attached to the rear end of the arm. The arm moves up and down against a downward force exerted by a bias element, following changes in terrain as the wheel moves up and down relative to the frame. Typically one or two further arms, or legs, extend downward from the arm and a furrow opener is attached to the bottom of each leg. In some air seeders as well, the bias element is a hydraulic cylinder operative to provide the necessary bias force, as well as to raise the furrow opener from the operating position. Such an air seeder is generally disclosed in U.S. Pat. No. 5,396,851 to the present inventor Beaujot.

In any event the furrow opener arm must move freely about its pivotal attachment to the frame. It is desirable to have the furrow opener held in a fixed lateral position to maintain seeding accuracy so the pivotal attachment must be substantially rigid laterally. While moving along a field in a straight line, the lateral forces on the arm are minimal, but during operations the arm is subjected to increased lateral forces when turning and/or when the furrow opener hits the edge of a rock, or like obstruction. The arm, generally made of steel, has some inherent resilience that allows it to flex sideways when subjected to high lateral forces, and then spring back to the properly aligned position.

These high lateral forces cause substantial stress on the pivot mechanism attaching the arm to the frame. The furrow opener is often a considerable distance from the pivot mechanism, such that considerable torque is applied, multiplying the lateral force exerted on the mechanism.

Typically, the pivot mechanism is provided by a bracket fixed to the frame with arm members on each side of the bracket, or alternatively a pair of brackets fixed to the frame, with the arm located between the brackets. A pivot pin through the bracket and the end of the arm provides the pivotal attachment of the arm to the frame. In addition to providing the required pivotal movement of the arm, the pin also exerts the forces required to resist the lateral forces exerted on the arm, and the pin is thus subjected to considerable lateral or bending forces.

Sometimes the brackets are quite widely separated, and the arm includes a lateral brace such that the arm and brace are attached by separate pins, one to each bracket. The wider spacing of the brackets provides at least some degree of torque on the arm to resist the lateral forces exerted on the arm.

A major problem with such conventional pivot mechanisms is that the lateral bending forces cause the pins and brackets wear. In normal operation the arm pivots about the pin, the pin experiences minimal bending forces, and wear is relatively even. Where lateral forces must be resisted, as in rocky fields or where sharp turns are frequent, the lateral force exerted by the pin on the bracket increases, increasing the friction force exerted between the pin and the bracket. This causes increased resistance to the required pivotal movement between the pin and brackets, and wear increases significantly.

In certain air seeders, such as the air seeder of the '851 patent to Beaujot, and that disclosed in U.S. Pat. No. 4,762,075 to Halford, the air seeder comprises two generally downward oriented legs attached to the pivoting arm, which is supported by a wheel. The legs are located one behind the other, and separated laterally. A furrow opener is attached to the bottom of each leg such that seed and fertilizer can be placed in separate furrows that that are laterally, and possibly also vertically, spaced so that the fertilizer does not damage the seed.

One of the difficulties this two leg type of seeder has to overcome is that of residue clearance. In no-till seeding, the residue from the previous year's crop is present on the surface of the field, and this residue must pass between the downward extending legs that carry the furrow openers. Where the residue is heavy, or where straws are long, the residue can be gathered by the furrow opener legs, and create a clump that is carried along, pushing soil and eventually plugging the seeder. Where there are two legs for each seed row, these residue clearance problems are multiplied.

The rear leg is commonly slightly offset to the side by 1 to 2 inches and is 8 to 15 inches behind the front leg. Where the furrow opener on the first leg is a knife or hoe type opener, the residue often builds up on this front opener from its raking action. This residue build-up tends to release in small or not so small clumps as the seeder travels through the previous year's residue. The bigger clumps of residue that build up on the front leg tend to ride up on the front leg due to the lifting and rolling effect of the soil movement at the bottom of the leg caused by the knife engaging the soil. As their mass and volume increase, or as they get nudged off balance, these clumps tend to roll off the front leg to one side or the other. When they roll off in the direction that the rear leg is offset, they tend to be caught by the rear leg and so must also clear this rear leg before passing out under the machine.

SUMMARY OF THE INVENTION

It is the object of the present invention to provide a pivot mechanism for mounting a pivoting arm to a frame that overcomes problems in the prior art. It is a further object of the present invention to provide such a pivot mechanism wherein lateral forces at the pin of the pivot mechanism are reduced. It is a further object of the present invention to provide such a pivot mechanism wherein adjustment is readily accomplished to compensate for wear.

It is a further object of the present invention to provide an apparatus to reduce plugging of air seeder furrow opener legs with crop residue. It is a further object of the present invention to provide such an apparatus for use with an air seeder having a pair of closely adjacent front and rear furrow opener legs, a deflector adapted to prevent residue that falls off the front leg from being caught by the rear leg.

In a first aspect the invention provides a pivot mechanism for attaching an arm to an implement about a pivot axis, the mechanism comprising a pivot bracket attached to the implement and defining a bracket pivot hole, and having first and second bracket surfaces oriented substantially perpendicular to the pivot axis. An inner bushing is rotatably mounted in the bracket pivot hole and defines a pivot pin hole therethrough. An arm defines an arm pivot hole aligned with the bracket pivot hole such that an inner surface of the arm is substantially parallel to the first bracket surface. A pivot plate defines a plate pivot hole aligned with the bracket pivot hole such that an inner surface of the pivot plate is substantially parallel to the second bracket surface. The inner bushing is fastened to one of the arm and pivot plate. A first wear pad is located between the inner surface of the arm and the first bracket surface, and a second wear pad is located between the inner surface of the pivot plate and the second bracket surface. A pivot pin is aligned with the pivot axis and extends through the plate pivot hole, the pivot pin hole, and the arm pivot hole, wherein the pivot pin is secured to the inner bushing, and wherein the pivot pin is operative to adjustably squeeze the arm and pivot plate against the wear pads. A connector connects the arm and the pivot plate such that the pivot pin, the arm, the inner bushing, and the pivot plate rotate together about the pivot axis.

In a second aspect the invention provides a pivot mechanism for attaching a first member to a second member about a pivot axis, the mechanism comprising a first member defining a first pivot hole, and having first and second bearing surfaces oriented substantially perpendicular to the pivot axis. A second member defines a second pivot hole aligned with the first pivot hole such that an inner surface of the second member is substantially parallel to the first bearing surface. A pivot plate defines a plate pivot hole aligned with the first and second pivot holes such that an inner surface of the pivot plate is substantially parallel to the second bearing surface. A first wear pad is located between the inner surface of the second member and the first bearing surface, and a second wear pad is located between the inner surface of the pivot plate and the second bearing surface. A pivot pin is aligned with the pivot axis and extends through the plate pivot hole and the first and second pivot holes. Clamp means are operative to adjustably squeeze the pivot plate and second member against the wear pads, and a connector connects the second member and the pivot plate such that the second member and the pivot plate rotate together about the pivot axis with respect to the first member.

Thus lateral forces at the pivot mechanism are resisted by the pivot plate and arm bearing against the wear pads and the pivot bracket, rather than by the pivot pin. The clamp is readily adjusted during initial set up, and as the wear pad wears it can be tightened to compensate for that wear.

In a third aspect the invention provides a residue deflector apparatus adapted for attachment to a dual furrow opener apparatus, wherein the dual furrow opener apparatus comprises a front furrow opener leg and a rear furrow opener leg positioned behind and to a first side of the front furrow opener leg, and further comprises a furrow opening device at the bottom of each leg for engaging the ground and forming a furrow. The deflector apparatus comprises a shield adapted for attachment to the front leg, the shield extending from approximately ground level on the front leg up to an upper portion of the front leg, and from ground level on the front leg tapering outward toward the first side of the front leg such that an upper portion of the shield extends outward beyond the second leg such that crop residue falling off the upper portion of the shield falls beyond a path of the rear leg, and wherein the shield curves rearward as it tapers outward.

The deflector reduces plugging by deflecting residue that builds up on the front leg outward of the path of the rear leg so that the rear leg does not contact this residue. Lighter residue passes conventionally around the front leg near the ground, and is not appreciably affected by the deflector. Such light residue also passes conventionally around the rear leg.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
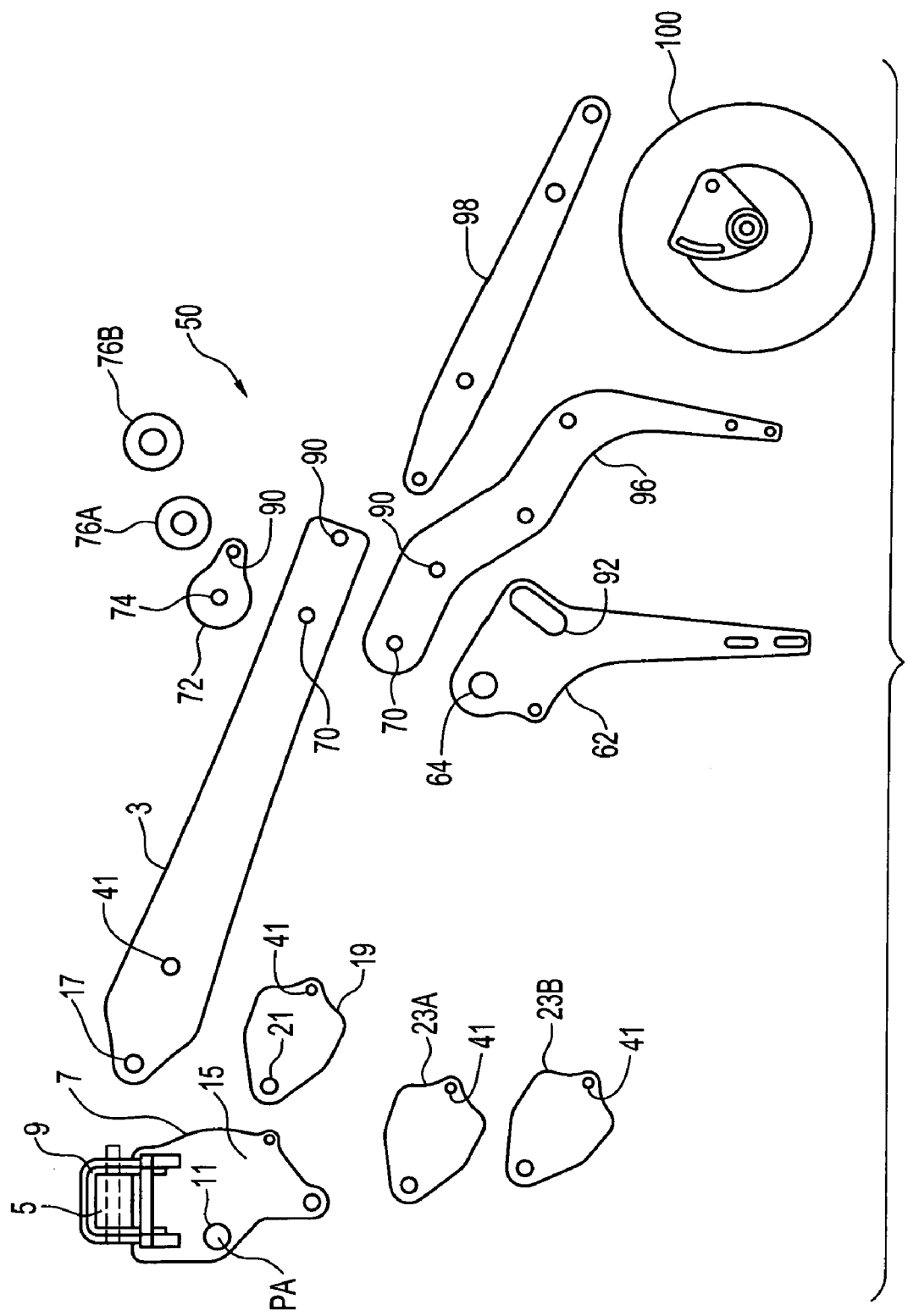
FIG. 1 is an exploded side view of a furrow opener apparatus incorporating two pivot mechanisms of the invention.
Figure 2:
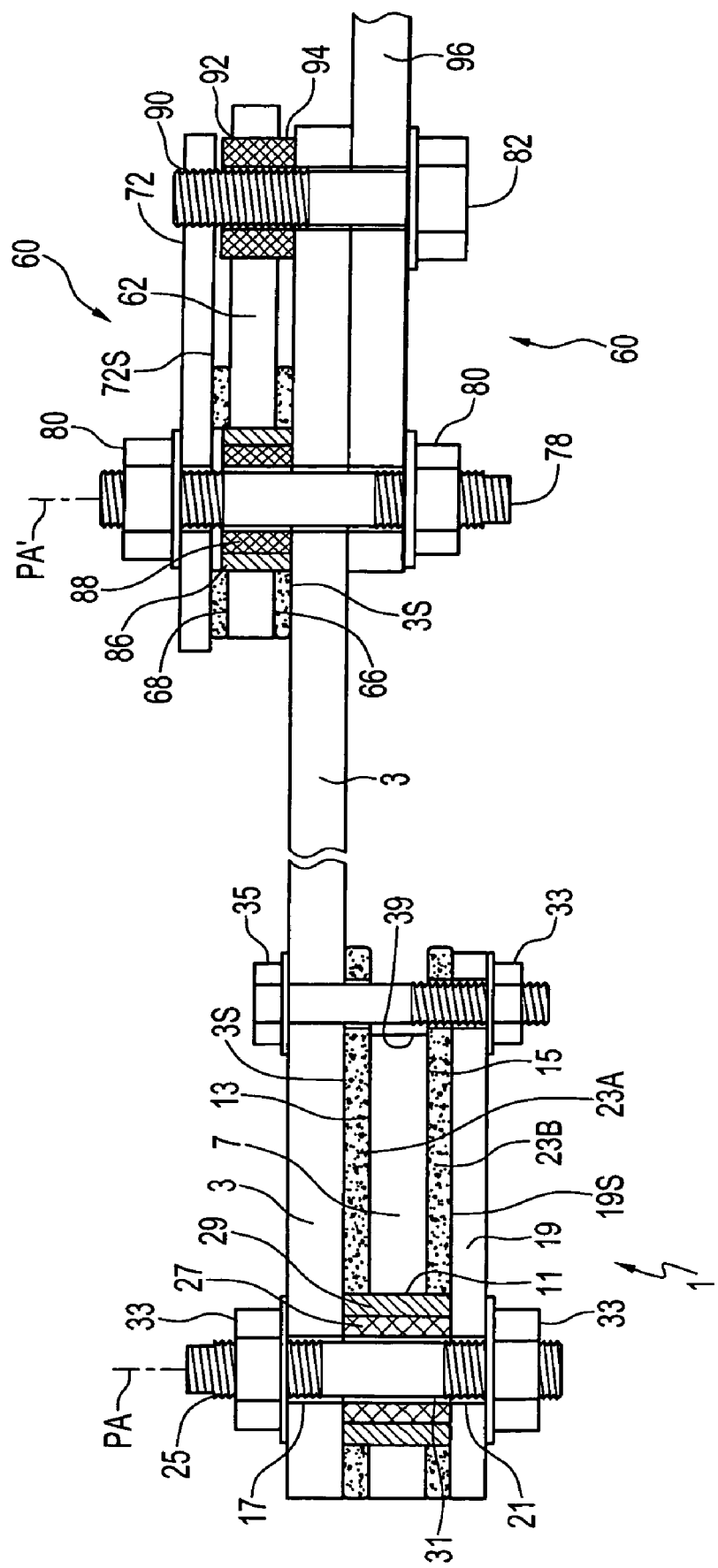
FIG. 2 is a schematic sectional view of the pivot mechanisms of embodiment of FIG. 1.
Figure 3:
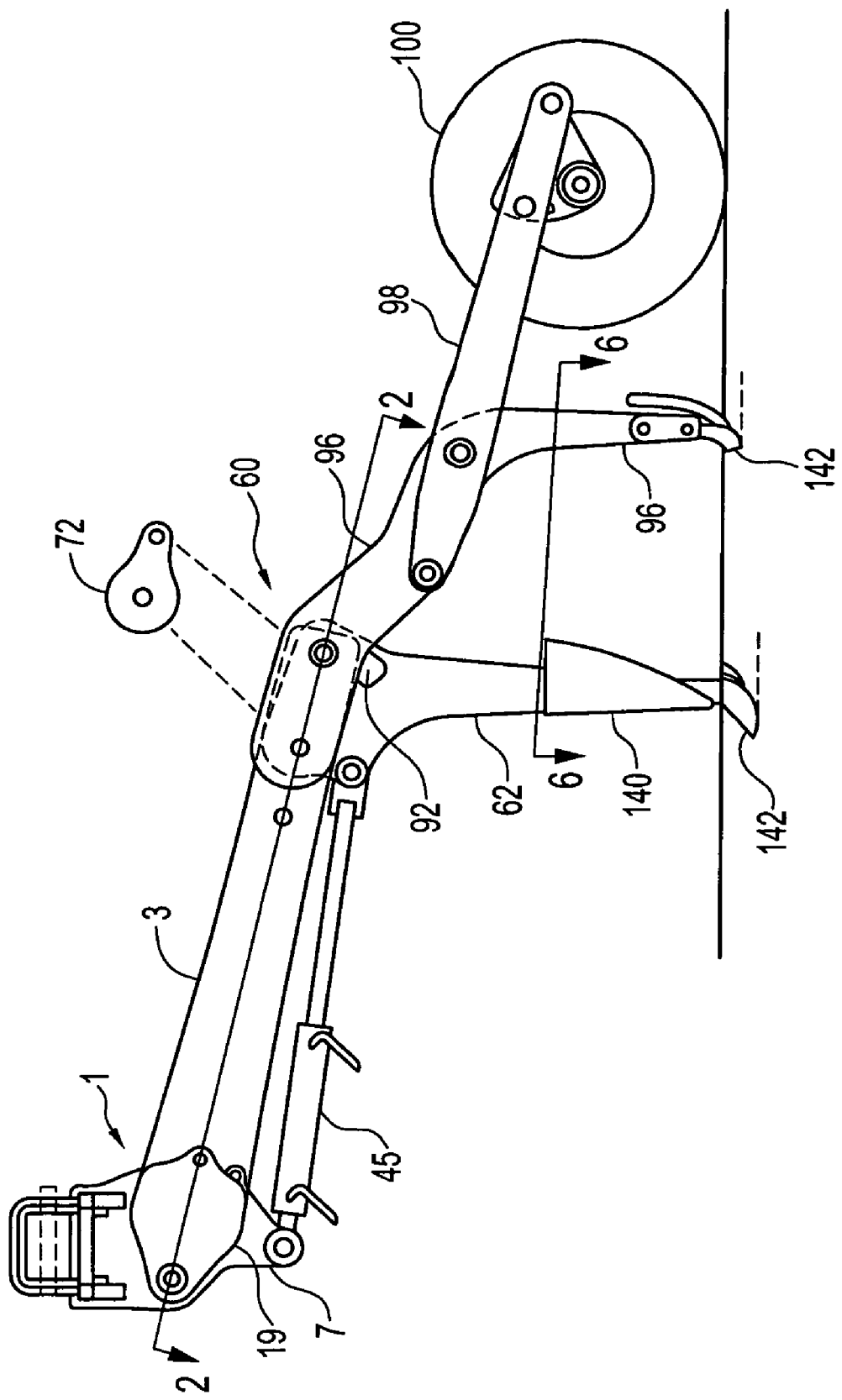
FIG. 3 is an assembled side view of the furrow opener apparatus of FIG. 1.

FIGS. 1 and 2 illustrate a pivot mechanism 1 of the invention for attaching an arm 3 to an implement 5 about a pivot axis PA. The illustrated embodiment is shown pivotally attaching a furrow opener apparatus 50 to an air seeder. FIG. 3 illustrates the furrow opener apparatus 50 in its assembled form.

The pivot mechanism 1 comprises a pivot bracket 7 attached to the implement 5 by U-bolts 9 as illustrated, or by welding or the like. The pivot bracket 7 defines a bracket pivot hole 11, and has first and second bracket surfaces 13, 15 oriented substantially perpendicular to the pivot axis PA.

The arm 3 defines an arm pivot hole 17 aligned with the bracket pivot hole 11 such that an inner surface 3S of the arm 3 is substantially parallel to the first bracket surface 13. A pivot plate 19 defines a plate pivot hole 21 aligned with the bracket pivot hole 11 such that an inner surface 19S of the pivot plate 19 is substantially parallel to the second bracket surface 15.

A first wear pad 23A is located between the inner surface 3S of the arm 3 and the first bracket surface 13, and a second wear pad 23B is located between the inner surface 19S of the pivot plate 19 and the second bracket surface 15. The wear pads 23A, 23B are made from plastic or urethane material that is resistant to wear, and are held in position by holes that correspond to holes in the arm 3 and pivot plate 19, as best illustrated in FIG. 1.

A pivot pin 25 is aligned with the pivot axis PA and extends through the plate pivot hole 21, the bracket pivot hole 11, and the arm pivot hole 17. The pivot plate 19 and arm 3 are squeezed against the wear pads 23A, 23B by tightening lock nuts 33 on threaded portions of the pivot pin 25. The arm 3 and the pivot plate 19 are connected by bolt 35 such that the arm 3 and the pivot plate 19 rotate together about the pivot axis PA provided by the pivot pin 25.

Thus in the pivot mechanism 1 of the invention, lateral forces exerted on the arm 3 are resisted by pressure of the inner surfaces 3S, 19S of the arm 3 and pivot plate 19 against the wear pads 23A, 23B and through them to the pivot bracket 7. Thus lateral bending forces on the pivot pin 25 are reduced, and wear on the pivot pin 25 is reduced. The invention reduces the "push-pull" effect or twisting on the pivot pin that is inherent when using two spaced members as in the prior art mounting of FIG. 4.

Figure 4:
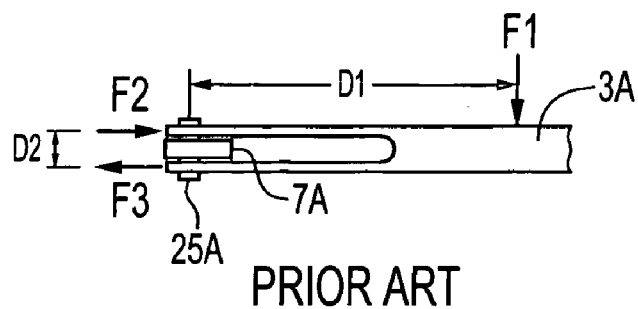
FIG. 4 is a schematic of a prior art pivot mechanism showing the lateral bending forces exerted on the pivot pin.

In FIG. 4, a lateral force F1 on the arm 3A causes bending forces F2 and F3 on the pivot pin 25A. The forces F2 and F3 are substantially equal to D1/D2 multiplied by the force F1. Thus where D1 is large, the forces on the pin can be very substantial. Increasing the distance D2 can reduce the forces F2, F3 but where F1 is high. F2 and F3 will still be high. These push-pull or twisting forces add to the wear of the pivot pin of the prior art, and are greatly reduced or eliminated in the pivot mechanism of the present invention.

Further reductions in wear and improved performance are realized by providing bushings 27, 29. In the illustrated embodiment an inner bushing 27 is rotatably mounted in an outer bushing 29 in the bracket pivot hole 11. The inner bushing 27 defines a pivot pin hole 31 and the pivot pin 25 passes through the pivot pin hole 31. For best results, the inner bushing 27 is secured to the pivot pin 25 and either the arm 3 or pivot plate 19, such that the inner bushing 27, pivot pin 25, arm 3, and pivot plate 19 all rotate together. In this way it is assured that during pivoting, the inner bushing 27 rotates in the outer bushing 29. Otherwise the pivot pin 25 could turn in the inner bushing 27, or the pivot plate 19 and arm 3 could turn on the pivot pin 25. It is preferred that such turning between other parts be prevented, and that the required turning during pivoting take place between the inner and outer bushings 27, 29 which can be readily replaced if worn. If the other parts are held stationary with respect to each other, there will be no wear between them.

In the illustrated embodiment, the pivot pin 25 is threaded and the inner bushing 27 is threaded onto the pivot pin 25 and tightened against the arm 3. The pivot pin 25 is also threaded on each end to accommodate lock nuts 33 to provide a clamp means operative to adjustably squeeze the pivot plate 19 and arm 3 against the wear pads 23A, 23B.

As can be seen in the FIG. 1, the furrow opener apparatus 50 is quite lengthy, such that lateral forces exerted thereon by obstacles, or by turning are multiplied substantially at the pivot mechanism 1. In the illustrated pivot mechanism 1, there is a second clamp means provided by the bolt 35. The pivot plate 19 and wear pads 23A, 23B extend beyond an outer edge 39 of the pivot bracket 7 such that the bolt 35 clears the pivot bracket 7 so the arm 3 and pivot plate 19 can move up and down with respect to the pivot bracket 7. Alternatively, as further illustrated below, the bolt 35 could extend through a slot in the arm.

The bolt 35 passes through aligned holes 41 in the arm 3, pivot plate 19, and wear pads 23A, 23B at a location such that the bolt clears the pivot bracket. A lock nut 33 on the bolt 35 is used to adjustably squeeze the arm 3 and pivot plate 19 against the wear pads 23A, 23B at a location removed from the pivot pin 25.

The pivot bracket 7 in pivot mechanism 1 extends some distance rearward from the bracket pivot hole 11. The second clamp, bolt 35, allows more precise adjustment of the pressure of the arm 3 and pivot plate 19 against the wear pads 23A, 23B, and also ensures the pressure is substantially the same along the length of the pivot bracket. The lock nuts 33 can be fairly tight in the illustrated application, since the arm 3 is forced up and down by a hydraulic cylinder 45. The pivot mechanism 1 is thus readily adjusted at the factory, and as the wear pads 23A, 23B wear down, the lock nuts 33 can be tightened as required to prevent unwanted play in the pivot mechanism 1.

In the illustrated furrow opener apparatus 50, a leg 62 is pivotally attached to the arm 3 about a pivot axis PA' by a second pivot mechanism 60. This pivot mechanism functions in the same manner as the prior pivot mechanism 1, however the leg 62 takes the place of the pivot bracket 7.

In both pivot mechanisms 1 and 60 a first member is pivotally attached to a second member about a pivot axis such that they pivot with respect to each other. Either member can be fixedly attached to an implement or other structure, or as in the second pivot mechanism 60 of the illustrated furrow opener apparatus, both members can move, both with respect to each other and with respect to the implement.

In the second pivot mechanism 60, the first member is the leg 62 defining a first pivot hole 64, and having first and second bearing surfaces 66, 68 oriented substantially perpendicular to the pivot axis PA'. The second member is the arm 3 defining a second pivot hole 70 aligned with the first pivot hole 64 such that an inner surface 3S of the arm 3 is substantially parallel to the first bearing surface 66.

A pivot plate 72 defines a pivot plate hole 74 aligned with the first and second pivot holes 64, 70 such that an inner surface 72S of the pivot plate 72 is substantially parallel to the second bearing surface 68. A first wear pad 76A located between the inner surface 3S of the arm 3 and the first bearing surface 66, and a second wear pad 76B is located between the inner surface 72S of the pivot plate 72 and the second bearing surface 68.

A threaded pivot pin 78 is aligned with the pivot axis PA' and extends through the plate pivot hole 74, and the first and second pivot holes 64, 70. A clamp means provided by the threaded pivot pin 78 and lock nuts 80 is operative to adjustably squeeze the pivot plate 72 and arm 3 against the wear pads 76A, 76B.

Again, bushing means are provided in the first pivot hole 64 comprising an outer bushing 86 secured in the first pivot hole 64, and an inner bushing 88 rotatable in the outer bushing 86. Again the inner bushing 88 is secured to the pivot pin 78 and tightened to the arm 3 so as to rotate therewith.

The arm 3 and the pivot plate 72 are connected by bolt 82 through holes 90 in the arm 3 and pivot plate 72, such that the arm 3 and the pivot plate 72 rotate together about the pivot axis PA'. Since the leg 62 is not overly long, it is not required to have a second clamp removed from the pivot pin 78. Thus there is no nut on the bolt 82. In pivot mechanism 60, the bolt 82 passes through a slot 92 in the leg 62. The slot is configured to allow the leg 62 to pivot with respect to the arm through a desired pivot range. The bolt 82 as illustrated passes through a spacer 94 that substantially fills the width of the slot.

A second leg 96 is also attached rigidly to the arm 3 by pivot pin 78 and bolt 82 passing through holes 70 and 90 in the second leg 96. An arm extension 98 is attached to the second leg 96 by bolts, and a wheel 100 is attached to the end of the arm extension 98. The illustrated furrow opener apparatus follows the ground on the wheel 100 since it is biased in a downward direction by the hydraulic cylinder 45.

Figure 5:
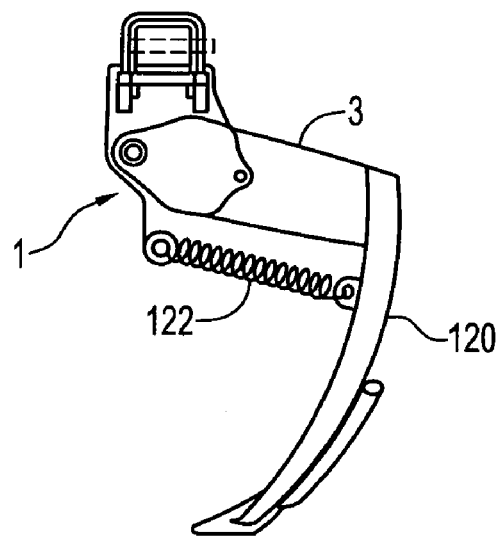
FIG. 5 is a side view of a pivot mechanism in an alternate furrow opener apparatus.

FIG. 5 shows the pivot mechanism 1 used on another style of furrow opener apparatus comprising a single downward extending leg 120 attached to the arm 3, and biased conventionally by a spring 122.

Figure 6:
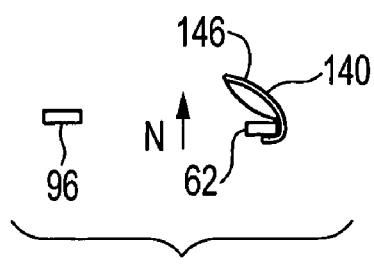
FIG. 6 a sectional top view of a residue deflector of the invention mounted on the furrow opener apparatus.
Figure 7:
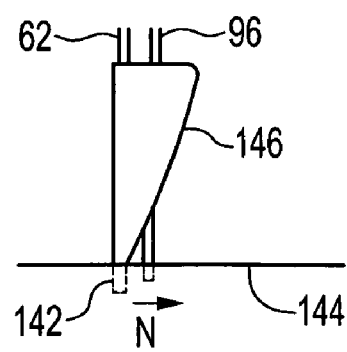
FIG. 7 is a front view the residue deflector of FIG. 5 mounted on the furrow opener apparatus.

FIG. 3 also discloses a residue deflector apparatus 140 adapted for attachment to dual furrow opener apparatus, such as that illustrated, comprising a front furrow opener leg 62 and a rear furrow opener leg 96 positioned behind and to a first side N of the front leg 62 as illustrated in FIGS. 6 and 7. A furrow opening device, illustrated as a knife 142, is mounted at the bottom of each leg for engaging the ground 144 and forming a furrow.

The deflector apparatus 140 comprises a shield 146 adapted for attachment to the front leg 62. The illustrated embodiment attaches along the second side of the front leg 62 with bolts or the like such that the shield 146 wraps around a front edge of the front leg 62. The front of the illustrated shield 146 is rounded. Wrapping the shield 146 around the front of the leg 62 provides the opportunity to round off the square shaped front of the illustrated leg 62 to facilitate residue sliding off the front leg 62. The shield 146 has a smooth surface of plastic or metal to further facilitate residue sliding off.

The shield 146 extends from approximately ground level on the front leg 62 up to an upper portion of the front leg 62, and from ground level on the front leg 62 the shield 146 tapers outward toward the first side N of the front leg 62. The upper portion of the shield 146 extends outward beyond the second leg 96, and curves rearward as it tapers outward. The shield 146 tapers from narrow at the bottom to wider at the top so as to not restrict the normal upward movement of residue on the lower front surface of the first leg 62, and yet be of a width sufficient at the height where the larger clumps roll off to significantly reduce the accumulation of residue landing on the second leg 96.

Generally in field areas where the residue is shorter and sparser, residue flows around the front leg 62 readily, but in areas where longer or thicker residue is present, it tends to ride up the front leg before spilling off to one side or the other. The configuration of the deflector apparatus 140 allows for normal operation in the sparser residue areas, while deflecting larger clumps off to the side so that the rear leg 96 does not come in contact with them.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. A residue deflector apparatus adapted for attachment to a dual furrow opener apparatus, wherein the dual furrow opener apparatus comprises a front furrow opener leg and a rear furrow opener leg positioned behind and to a first side of the front furrow opener leg, and further comprises a furrow opening device at the bottom of each leg for engaging the ground and forming a furrow, the deflector apparatus comprising:
  a shield adapted for attachment to the front leg, the shield extending from approximately ground level on the front leg up to an upper portion of the front leg, and from ground level on the front leg tapering outward toward the first side of the front leg such that an upper portion of the shield extends outward beyond the rear leg such that crop residue falling off the upper portion of the shield falls beyond a path of the rear leg, and wherein the shield curves rearward as it tapers outward.

2. The apparatus of claim 1 wherein the shield is adapted for attachment along a second side of the front leg such that the shield wraps around a front edge of the front leg.

3. The apparatus of claim 2 wherein a front of the shield is rounded to facilitate residue sliding off the front leg towards either side.

4. The apparatus of claim 1 wherein the shield comprises a smooth surface to facilitate residue sliding off the shield.

* * * * *